United States Patent [19]

Konrad et al.

[11] 4,423,362

[45] Dec. 27, 1983

[54] ELECTRIC VEHICLE CURRENT REGULATING SYSTEM

[75] Inventors: Charles E. Konrad, Roanoke, Va.; Robert C. Clark, deceased, late of Roanoke, Va., by Jean B. Clark, executrix

[73] Assignee: General Electric Company, Salem, Va.

[21] Appl. No.: 379,867

[22] Filed: May 19, 1982

[51] Int. Cl.³ .............................................. H02P 5/10
[52] U.S. Cl. .................... 318/139; 318/296; 318/334; 318/345 A
[58] Field of Search ............. 318/139, 255, 318, 334, 318/345, 345 A, 392, 399, 404, 296, 471–473, 138

[56] References Cited

U.S. PATENT DOCUMENTS

| | | | |
|---|---|---|---|
| 3,753,077 | 12/1973 | Anderson et al. | 321/45 |
| 3,777,237 | 12/1973 | Anderson | 318/345 |
| 3,843,912 | 10/1974 | Anderson | 318/258 |
| 3,868,554 | 2/1975 | Konrad | 318/434 |
| 4,188,569 | 2/1980 | Campbell | 318/139 |
| 4,195,254 | 3/1980 | Gurwicz et al. | 318/334 |
| 4,301,396 | 11/1982 | Bourke | 318/334 |
| 4,357,565 | 11/1982 | Saito et al. | 318/334 |
| 4,384,312 | 5/1983 | Fry | 318/334 |

Primary Examiner—J. V. Truhe
Assistant Examiner—A. Evans
Attorney, Agent, or Firm—Ormand R. Austin; Arnold E. Renner

[57] ABSTRACT

A control system for a separately excited DC electric traction motor in an electrically powered vehicle incorporates a plurality of current limit functions designed to protect both the motor and control electronics. A time dependent current limit is utilized to permit overcurrent conditions for limited time intervals such that additional power can be obtained for sudden torque requirements without having to design the motor or control electronics to function under continuous high torque conditions. The continuous current limit values based on percent conduction time of a thyristor chopper circuit in the control system is modified in response to overheating of the motor and the main switching thyristor, to overvoltage on the thyristor commutating capacitor and to available voltage for powering the motor.

9 Claims, 14 Drawing Figures

ELECTRIC VEHICLE CURRENT REGULATING SYSTEM

BACKGROUND OF THE INVENTION

The present invention is directed to power control systems for electric traction motor propelled vehicles and, more particularly, to a control system having a plurality of variable current limit functions.

In present day electric vehicles, electronic power regulators are used to control the torque, or speed, developed by electric traction motors. Typically the regulator comprises a time ratio of chopper circuit which varies the power developed by the motors by controlling the percentage of time that the motors are connected directly to a power source. For maximum mobility, the power source is a battery which limits the available power to the motors. The regulator also includes apparatus responsive to accelerator position for varying the ratio of conduction to non-conduction time of the chopper circuit.

The control system for the power regulator includes a current limit circuit which limits the maximum average current which may be supplied to the traction motors. Depending upon the mode of operation, the maximum average current to the motor may be limited because of the commutation limits inherent in the motor itself or because of over heating of the power semiconductor devices which regulate the power to the motor. Although a fixed maximum level of current limit is sometimes employed, it is also known to vary the current limit as a function of the percentage conduction time of the time ratio or chopper circuit.

The application of either a fixed current limit or a current limit which varies only as a function of the percent conduction time of the chopper circuit raises some unusual problems when the control system is controlling a separately excited direct current electric motor in a traction vehicle such as a fork lift truck. In a separately excited motor system, the motor field winding does not provide current limiting for the low impedance armature winding. Accordingly, a very large armature current can be obtained under stall conditions if the solid state switch is bypassed with a contactor as is customary with series motors since armature resistance is typically only one-third of the total motor resistance. If a wheel of the truck drops into a depression or runs up against a dock plate, a very high current may be required from the solid state switch for a short time interval in order to allow the truck to overcome the dock plate or to climb out of the depression. If the regulator is designed to provide this high current capacity continuously, the power handling requirements are large and may require activation of the thermal protection circuit at an unacceptably low value to prevent damage to the chopper circuit as well as a need for unnecessary thermal capacity of commutating circuit components. Alternately, such a high continuous current limit could result in damage to the traction motor if it were misused under normal conditions.

It is an object of the present invention to provide an upward current limit system for a chopper circuit controlled electric traction motor.

It is another object of the present invention to provide a current limit system which permits a current overload without causing motor or control circuit deterioration.

SUMMARY OF THE INVENTION

A current regulating system is incorporated in a microcomputer control for a time ratio control switching regulator system connected for controlling the application of power to a separately excited dc electric traction motor. In an electric vehicle application, a vehicle mounted accelerator provides a desired motor torque command in the form of a desired current signal. The microcomputer control system monitors actual motor current and responds to the desired motor current signal to regulate the actual motor current to the desired value so long as the desired value does not exceed a current limit value. The microcomputer sets an instantaneous current limit value based upon the percent conduction time of the time ratio control system. At initial startup, the percent conduction time is low and a maximum value of current limit is in effect. As the percent conduction time increases, the current limit value is lowered proportionally to a minimum value which can be maintained without damage to the motor or control electronics.

However, in a separately excited motor under stalled conditions, the solid state circuit must temporarily supply an unusually high current to climb out of depressions or up ramps. Since that level of current can rapidly overheat the armature and commutating circuit components, the microcomputer keeps track of the length of time during which the current is maintained at the current limit value and, after a predetermined time, begins to reduce the current limit value at a controlled rate. When the circuit is operating at less than the current limit level, the amount of available short term capacity is increased. The rate of increase or decrease in available short term capacity is made to follow the temperature of the protected commutated components.

The system in one form also includes thermal sensors responsive to the temperature of the power regulator main switch semiconductor for forcing a reduction in the current limit value. If the temperature exceeds a predetermined value, a thermal cutback circuit is activated to force the current limit value to decrease towards zero at a rate proportional to the increase in temperature above the predetermined value. In an embodiment of the system wherein the time ratio control circuit comprises a thyristor and associated commutation circuit, the system also includes a voltage sensor for monitoring the voltage developed on a commutating capacitor and for providing a signal to the microcomputer proportional thereto. If the voltage developed on the commutating capacitor exceeds a predetermined maximum value which corresponds to the capacitor voltage limit, the microcomputer responds to the voltage signal by reducing the current limit value to prevent excessive capacitor voltage. In a still further embodiment, the system includes a battery monitor which reduces the current limit value when the battery state of charge drops below a predetermined level. This latter feature forces the truck to operate in a sluggish manner to thereby encourage its return to a battery charging station and prevent excessive or damaging discharge levels.

BRIEF DESCRIPTION OF THE DRAWING

The novel features which are believed to be characteristic of the invention are set forth in the appended claims. The invention itself, however, both as to its advantages and objects may best be understood by reference to the following description taken in conjunction with the accompanying drawing in which:

FIG. 3, comprising the graphs labeled

FIG. 6, comprising the sheets labled

DETAILED DESCRIPTION

Figure 1:
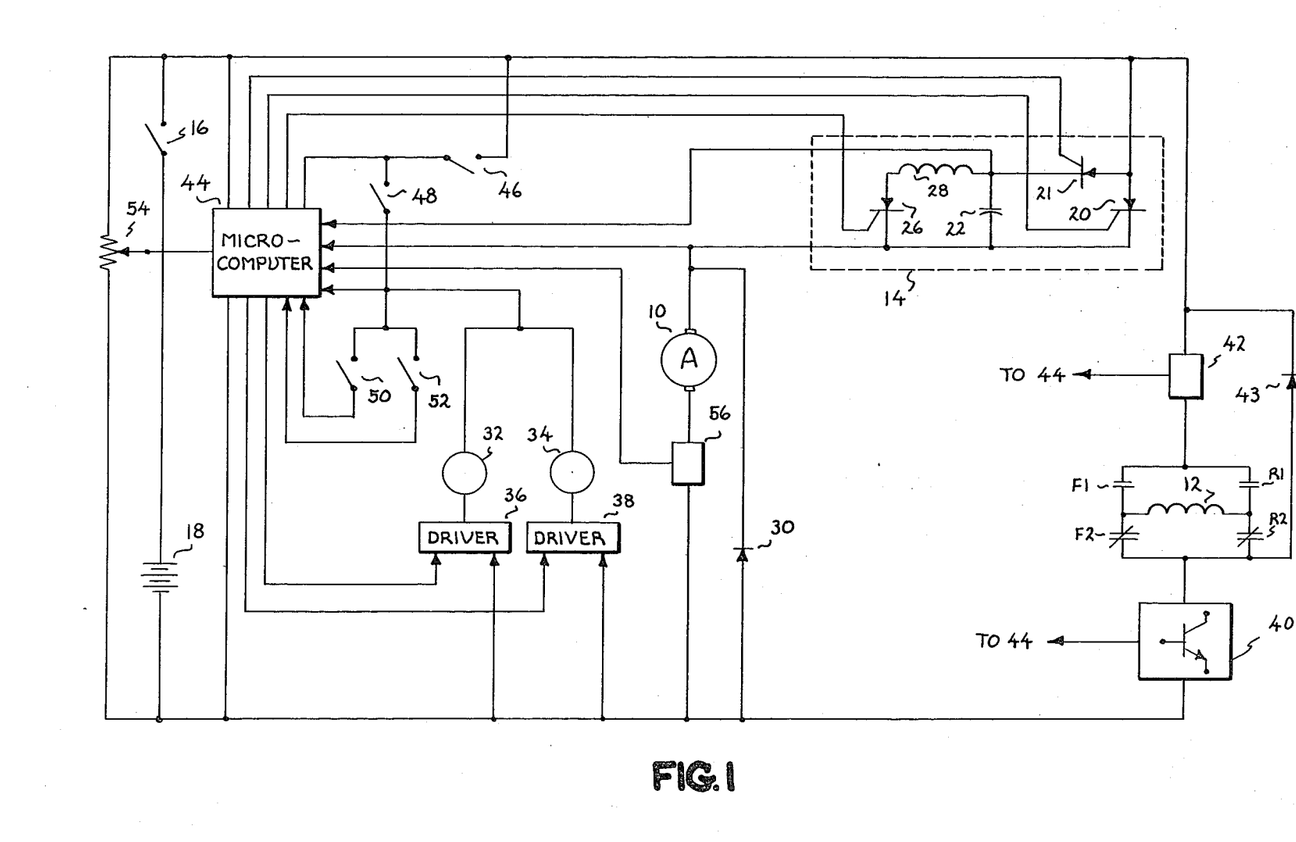
FIG. 1 is a simplified partial block diagram and partial schematic of a time ratio power regulator system for a separately excited direct current electric traction motor.

Reference is now made to FIG. 1 wherein there is illustrated a basic power circuit for a separately excited dc electric motor and a microcomputer based control system for the power circuit. The power circuit for the dc motor comprising armature 10 and field winding 12 includes a variable mark-space ratio chopper circuit 14 and a key switch 16 which serves to connect the motor armature 10 across a battery 18. Preferably chopper circuit 14 comprises a silicon controlled rectifier (SCR) 40 and a controllable commutation circuit including a commutation capacitor 22, SCR's 21 and 26 and an inductor 28. A detailed description of the operation of the chopper circuit 14 may be had by reference to U.S. Pat. No. 3,826,959 issued July 30, 1964 and assigned to General Electric Company. A free-wheeling diode 30 provides a path for inductive current when chopper circuit 14 switches to a non-conductive state.

The separately excited field winding 12 is arranged to be connected in either a forward or reverse direction, where forward and reverse refer to the direction of rotation of the motor armature 10, by means of contacts F1, F2 and R1, R2. The contacts F1, F2, R1 and R2 are shown in their normal deenergized state. Control of contacts F1 and F2 is through a contactor actuating coil 32 while contacts R1 and R2 are controlled by a contactor actuating coil 34. The coils 32 and 34 are connected across the battery 18 by means of respective contactor driver circuits 36 and 38. The driver circuits 36 and 38 may be in the form illustrated in application Ser. No. 299,047 filed Sept. 1, 1981 and assigned to General Electric Company.

Excitation of field winding 12 is regulated by a series connected circuit 40 which is preferably a transistorized current regulator of a type well known in the art. A current sensor 42 connected in series with winding 12 provides a signal representative of the magnitude of field current excitation. If where regulator 40 is a chopper type, a free wheeling diode 43 is provided for inductive current during the non-conductive time interval of circuit 40.

The control functions are implemented in a microcomputer 44 which includes the necessary hardware such as counters, registers, memory units and microprocessors for performing the control functions. In addition to providing the control signals for regulating current through the armature 10 and field winding 12, the microcomputer 44 is also connected to perform selected safety checks by monitoring the status of a seat switch 46, a brake switch 48 and forward and reverse direction switches 50 and 52. A vehicle mounted accelerator 54 provides an input signal indicative of the percent accelerator displacement and the corresponding desired motor torque to the microcomputer 44. A current sensor 56 connected in series with armature 10 provides a signal to the microcomputer 44 indicative of the magnitude of current in armature 10.

Figure 2:
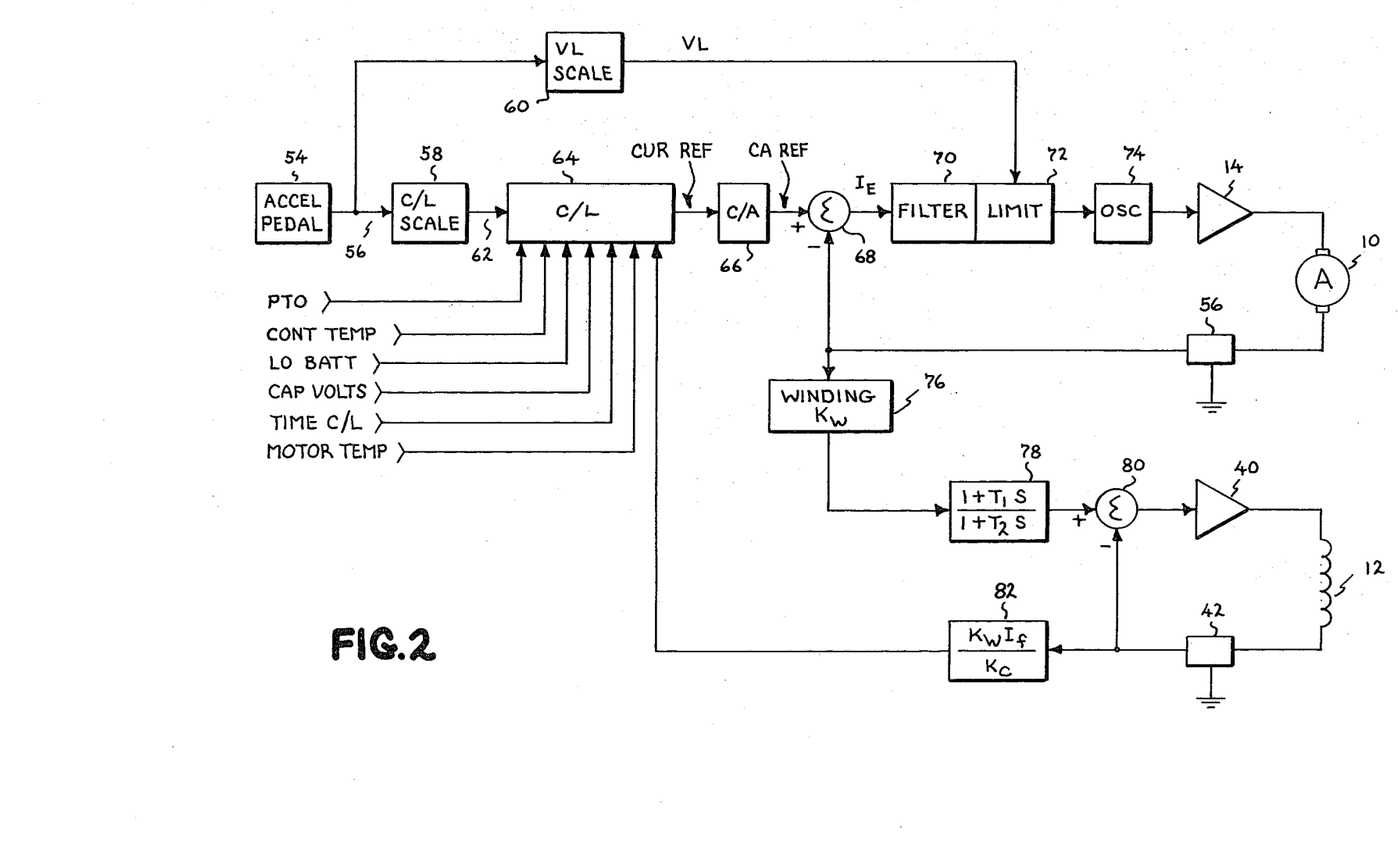
FIG. 2 is a functional block diagram of a power regulator system in accordance with the present invention.

Referring now to FIG. 2, there is illustrated a functional block diagram of a regulator system incorporating a current limit system in accordance with the present invention. The accelerator 54 provides a reference signal on line 56 which is coupled to a current limit scaling block 58 and also to a voltage limit scaling circuit 60. The current limit scaling block 58 generates a desired current signal proportional to accelerator displacement which is coupled via line 62 to the current limit block 64. The current limit block 64 controls the desired current signal as a function of a number of system variables. As illustrated in FIG. 2, the preferred system variables are percent conduction time (PTO) of the armature chopper circuit 14, the temperature of the control system (CONT. TEMP), the battery state of charge (LO BATT), the magnitude of voltage on the commutating capacitor 22 (CAP VOLTS), the temperature of the motor itself (MOTOR TEMP) and the time during which the system has actually been operating in a current limit mode (TIME C/L). Each of these variables may be used to limit the magnitude of the desired current signal.

The current limited desired current signal (CUR REF) as produced by the current limit block 64 is next coupled into a controlled acceleration block 66 which limits the rate of change of the CUR REF signal from a present value to a new value. The signal output (CA REF) from the controlled acceleration block 66 is now the current reference signal and is summed in a summing junction 68 with a feedback signal from the armature current sensor 56 to provide a current error signal ($I_E$).

The current error signal is coupled to a filter block 70 which limits the rate of increase of this signal. Connected to the filter block 70 is a limit block 72 which is designed to restrict the signal output of the filter block 70 on a percentage basis to be equal to or less than the percent accelerator displacement corresponding to the pedal reference signal on line 56. In other words, the signal output from filter block 70 cannot exceed the percent of its range represented by the percent of accelerator displacement, i.e., if the accelerator 54 is displaced 50 percent, then the signal from filter block 70 cannot exceed 50 percent of its maximum value. The voltage limit scaling block 60 adjusts the reference signal on line 56 to an appropriately scaled value to input to the limit block 72.

The limited current error signal developed by filter block 70 is coupled to an oscillator 74 whose mark-space ratio corresponds to the percent conduction time represented by the signal output of the filter block 70, i.e., when the signal from filter block 70 attains 50 percent of its maximum value, the oscillator 74 provides a 50 percent mark-space ratio output signal. The control signals generated by the oscillator 74 are coupled to the respective SCR's within the chopper circuit 14.

The current through field winding 12 is controlled as a predetermined function of the magnitude of armature current. The armature current signal from current sensor 56 is supplied to a function generator 76 which establishes the desired ratio of field to armature current. The function generator 76 also establishes the maximum magnitude and the minimum magnitude of the field current. The output signal developed by the function generator 76 is the field current command signal. This signal is coupled to a lag/lead network 78 which stabilizes or controls the response time of the field current regulator. From the lag/lead network 78, the current command signal is coupled to a summing junction 80. Another input of the summing junction 80 is connected to receive the field current feedback signal from the current sensor 42. The output signal developed by the summing junction 80 is the field current error signal which is applied to the field current regulator circuit 40 to control the magnitude of current supplied to the field 12.

The field current signal developed by current sensor 42 is also coupled to a function generator 82 and from function generator 82 to the current limit circuit 64. The purpose of this feedback loop is to prevent armature current surges, i.e., to prevent armature current from increasing at a faster rate than field current. Since the current limit circuit 64 operates on the commanded armature current, the function generator 82 provides a function which is an inverse of that provided by the function generator 76. In other words, the field current is converted to an armature current magnitude signal.

A more detailed description of the operation of the control system of FIG. 2, with the exception of the field current control portion and the current limit functions, may be had by reference to U.S. patent application Ser. No. 333,931 filed Dec. 23, 1981, and assigned to General Electric Company.

Figure 3A:
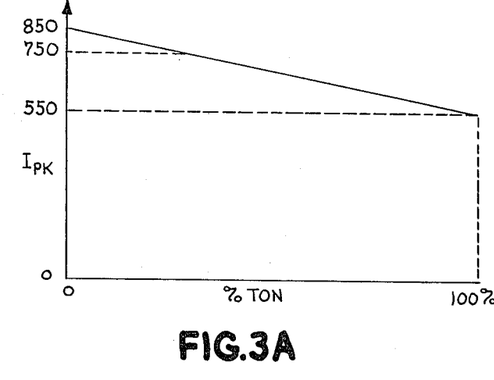
FIG. 3A through FIG. 3F, illustrate the multiple current limit functions implemented in the present inventive control system.
Figure 3B:
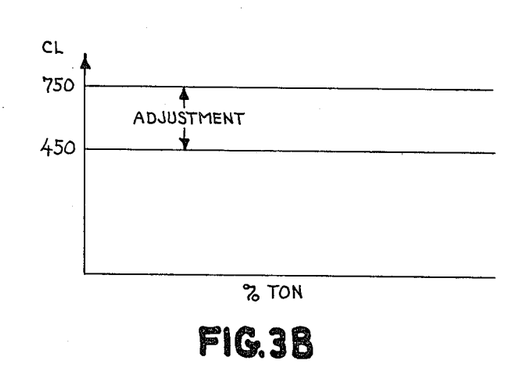

Referring now to FIG. 3 comprising the individual FIGS. 3A through 3F, there is illustrated a graph for each of the current limit functions incorporated in the control system of FIG. 2. FIG. 3A represents the variation in maximum allowable peak current as a function of the percent conduction time of the main thyristor 20 controlling armature current. For illustrative purposes typical current values have been assigned to the graphs to more clearly explain their operation. As can be seen the peak current established as a function of percent time on varies from 850 amps down to 550 amps. However, under normal operation the peak current is limited to a maximum of 750 amps. This will be apparent by reference to FIG. 3B which illustrates a manually adjustable current limit as a function of percent time on. It can be noted in FIG. 3B that the maximum adjustment is for 750 amps, although the current limit can be set as low as 450 amps.

Figure 3C:
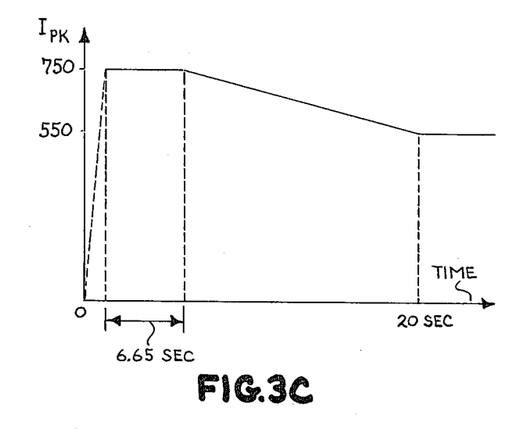

The more significant operational current limit is illustrated in FIG. 3C. Here it can be seen that peak current is limited as a function of the time period during which current is maintained at its current limit value. In this figure the sloping dotted line rising from 0 to 750 amps represents the rise time of armature current, which to a large extent, is controlled by the controlled acceleration block 66. Once the armature current has been forced up to its current limit value at 750 amperes, a timer is started to keep track of the time period during which the current is maintained at the current limit value. At the end of the first time period, illustrated here as 6.65 seconds, the system forces a reduction in the current limit value at a uniform rate over the next predetermined time period, illustrated as 20 seconds. At the end of the second predetermined time period, the current limit is held at a minimum value which is selected to minimize damage to the power electronics or to the motor itself. Provision is also made for reversing the timer whenever the system comes out of the current limit mode. The recovery time may be greater than the time required to reduce current to its minimum value.

Figure 3D:
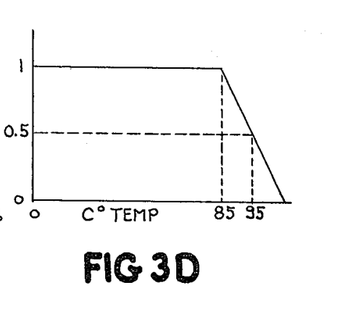

FIG. 3D represents the current limit as a function of temperature. As can be seen this function is basically a multiplier, i.e., for temperature less than a predetermined value, such as 85 degrees Centigrade, the multiplier is unity and the current limit does not affect the other current limit functions until the temperature exceeds the 85 degree mark. Above 85 degrees the multiplier drops toward zero by an amount proportional to the value by which the temperature exceeds 85 degrees, for example, the value of the multiplier may reach zero at 100 degrees C. The use of a multiplier of this nature modifies the dependent relationship of current limit to percent conduction of the main switch in the power regulator to permit maximum allowable current within the temperature limit of the switch.

Figure 3E:
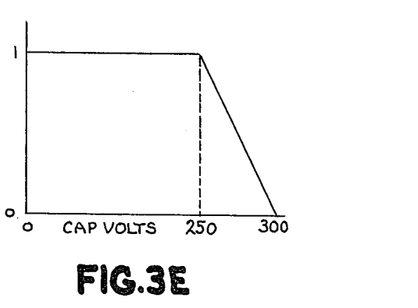
Figure 3F:
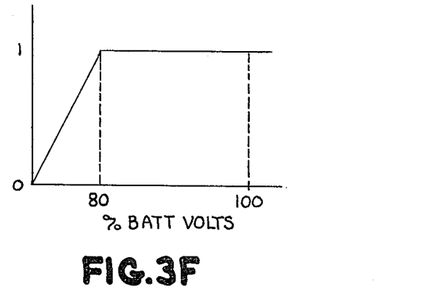

FIG. 3E is substantially the same as in FIG. 3D but in this case the monitored value is the voltage on commutating capacitor 22. For illustrative purposes, it is assumed that no cut-back is required as long as the capacitor voltage is less than 250 volts but that for voltage above that level the function would be forced toward zero at a controlled rate. In FIG. 3F a similar function is illustrated for battery voltage.

Figure 4:
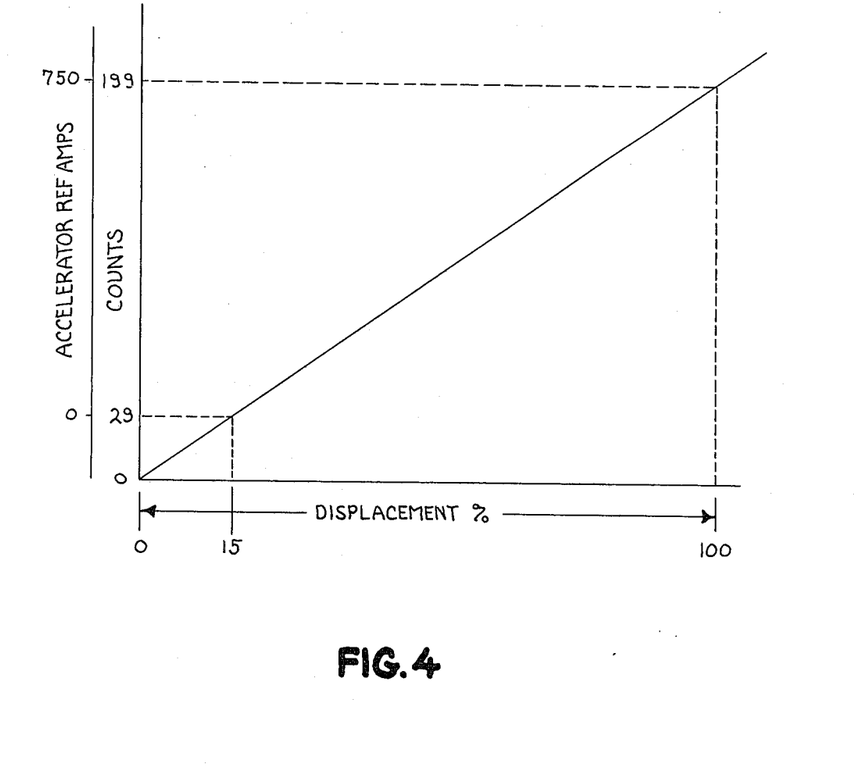
FIG. 4 represents a graph of accelerator output signal versus position.

Referring now to FIG. 4, there is shown a graph of accelerator displacement versus accelerator output. The accelerator output is scaled to appropriate digital count values in order to facilitate the explanation of the operation of the current limit system. It will be noted that for initial small displacement of the accelerator, no action of the control occurs. In particular, for less than 15 percent displacement, the accelerator does not generate sufficient voltage to pick up an accelerator switch (not shown) in order to allow the output of the accelerator to be applied to the control function. Accelerator reference in terms of amperes is therefore scaled from the approximate 15 percent reference point. For scaling purposes, the 750 ampere level has also been established at about 100 percent of accelerator displacement. For the present system, the output of the accelerator 54 drives a variable oscillator which converts accelerator position to a number of counts. Scaling for the counts is shown in the left column and indicates that 29 counts corresponds to approximately 15 percent accelerator displacement, and 205 counts equates to 100 percent accelerator displacement.

Figure 5:
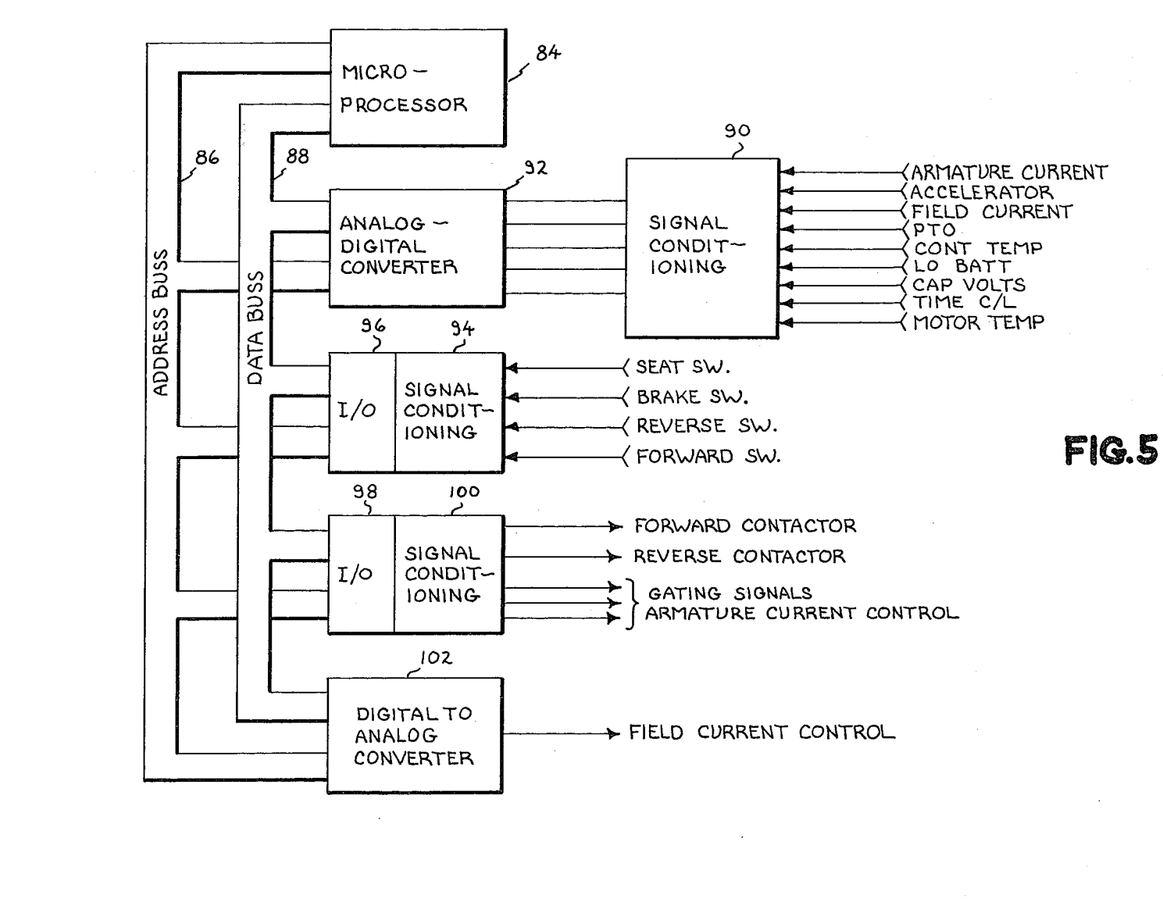
FIG. 5 is an illustration of the microcomputer interconnections and interfaces for implementing the present invention.

Referring now to FIG. 5, the microcomputer 44 is shown in more detail. A microprocessor 84 is coupled via an address bus 86 and a data bus 88 to a plurality of input/output interfaces. The microprocessor 84 may be any of the well known types such as a type 8031 available from Intel Corporation and is supported by addressable random access memory (RAM) and read only memory (ROM) (not shown) sufficient for program storage and storage of intermediate and computed or monitored variables. Intel Corporation types 2114 and 2716 are suitable for RAM and ROM, respectively.

A first signal monitoring circuit 90 is connected to receive the armature current signal from sensor 56 and the field current signal from sensor 42. The signal conditioning circuit 90 adjusts the amplitude of input signals to a level compatible with the apparatus connected to its output terminals, in this instance an analog to digital (A/D) converter 92. A/D converter 92 may be, for example, a type ADC0816 available from National Semiconductors, Inc. The digitized output signals from A/D converter 92 are coupled onto the address and data busses 86 and 88 under control of the microprocessor 84. In addition to the armature current signal, the accelerator pedal position signal and the various current limit signals are also coupled to the microprocessor 84 through signal conditioning circuit 90 and A/D converter 92.

A second signal conditioning circuit 94 provides an interface between microprocessor 84 and those system signals which are of a binary nature, i.e., those signals representative of switches being open or closed or of the system being in a propulsion or braking mode of operation. An input/output (I/O) interface circuit 96 couples the signals from signal conditioning circuit 94 to the address and data busses 86 and 88. The I/O circuit may be, for example, a type 6522 available from Rockwell International Corporation. As illustrated, the signal conditioning circuit 94 monitors the status of seat switch 46, brake switch 48, forward direction switch 50 and reverse direction switch 52.

Command signals developed by the microprocessor 84 are coupled through an I/O interface 98 and signal conditioner 100 to the control devices, e.g., the forward/reverse contactor driver circuits 36 and 38 and the switching devices within chopper circuit 14. The I/O interface 98 may also be a Rockwell International type 6522 device. The signal conditioning circuit 100 is a driver amplifier and level shifting circuit of a type well known in the art.

Also connected to the address and data busses 86 and 88 is a digital to analog (D/A) converter circuit 102 whose function is to provide an analog output signal representative of the desired magnitude of motor field current. The D/A circuit 102 may be a type AD558 available from Analog Devices, Incorporated. The signal from D/A circuit 102 is coupled to an input terminal of driver circuit 40 for regulating the desired level of field current.

Functionally, the microcomputer implemented regulator circuit of FIGS. 1 and 5 operates substantially as shown in the functional block diagram of FIG. 2.

Figure 6A:
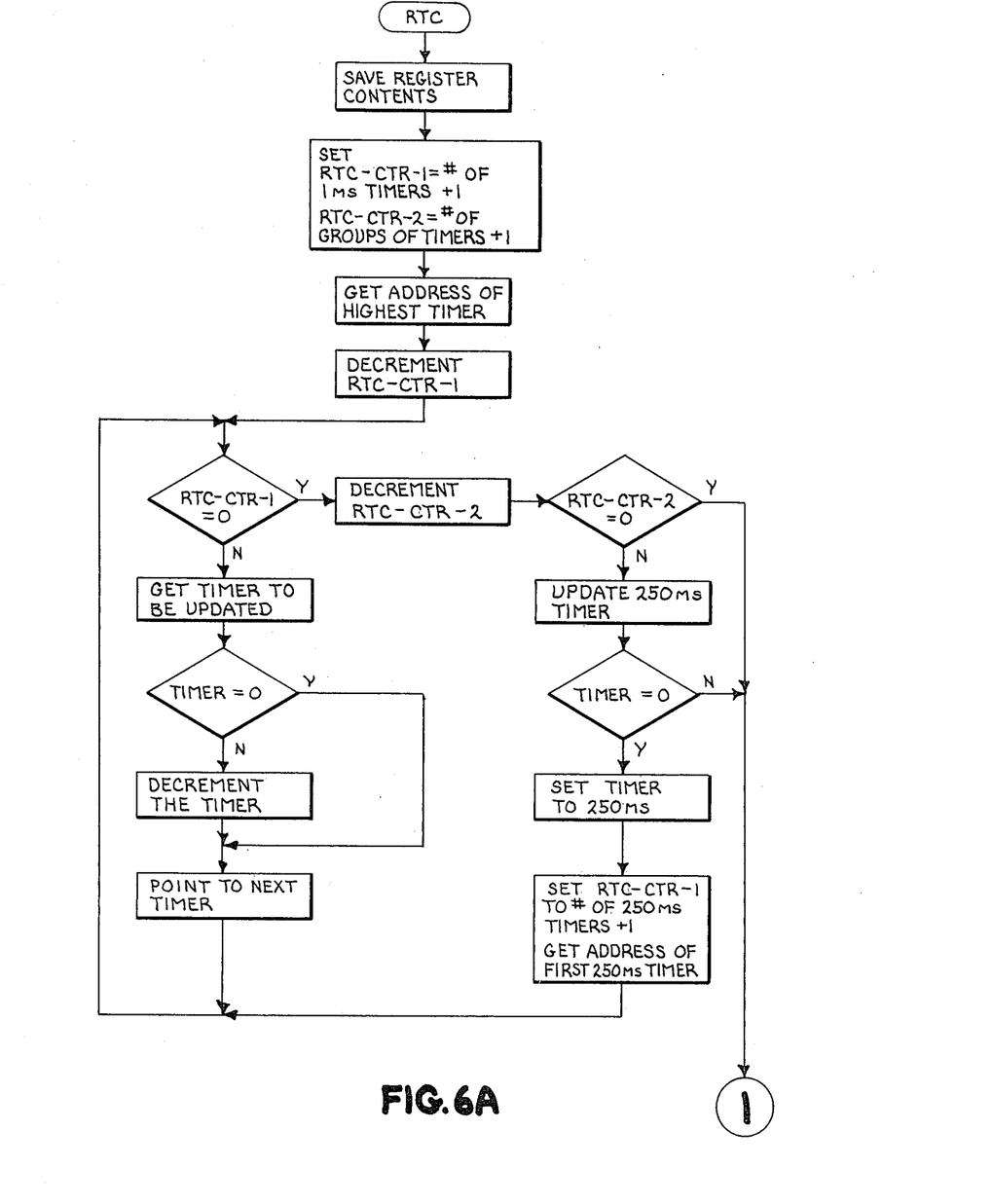
FIG. 6A through 6C, represent a flow chart for one portion of the computer program which develops the time dependent current limit function according to the present invention.

Referring now to FIG. 6, there is shown a flow chart for the real time clock service routine. Since the real time clock is serviced on an interrupt basis, at each interrupt time the present working register contents are saved before the service routine is processed. In a first subroutine, FIG. 6A, a plurality of timers are either decremented by one count or reset. The timers within the system perform various functions, such as providing tip bounce time delays or time delays during transition from one mode to another mode of operation. In the illustrated implementation, two groups of timers are involved, one group of one millisecond timers and a second group of 250 millisecond timers. The program first sets the number of one millisecond timers to be updated in one register (RTC-CTR-1) and then sets the number of 250 millisecond timers to be updated in a second register (RTC-CTR-2). The address of the first timer to be checked is obtained and the first register decremented. The program then loops through sequentially checking or updating each of the timers in the first group. When the first group is completed, the program exits into the second group and sequentially goes through decrementing or setting each of the timers in the latter group.

Figure 6B:
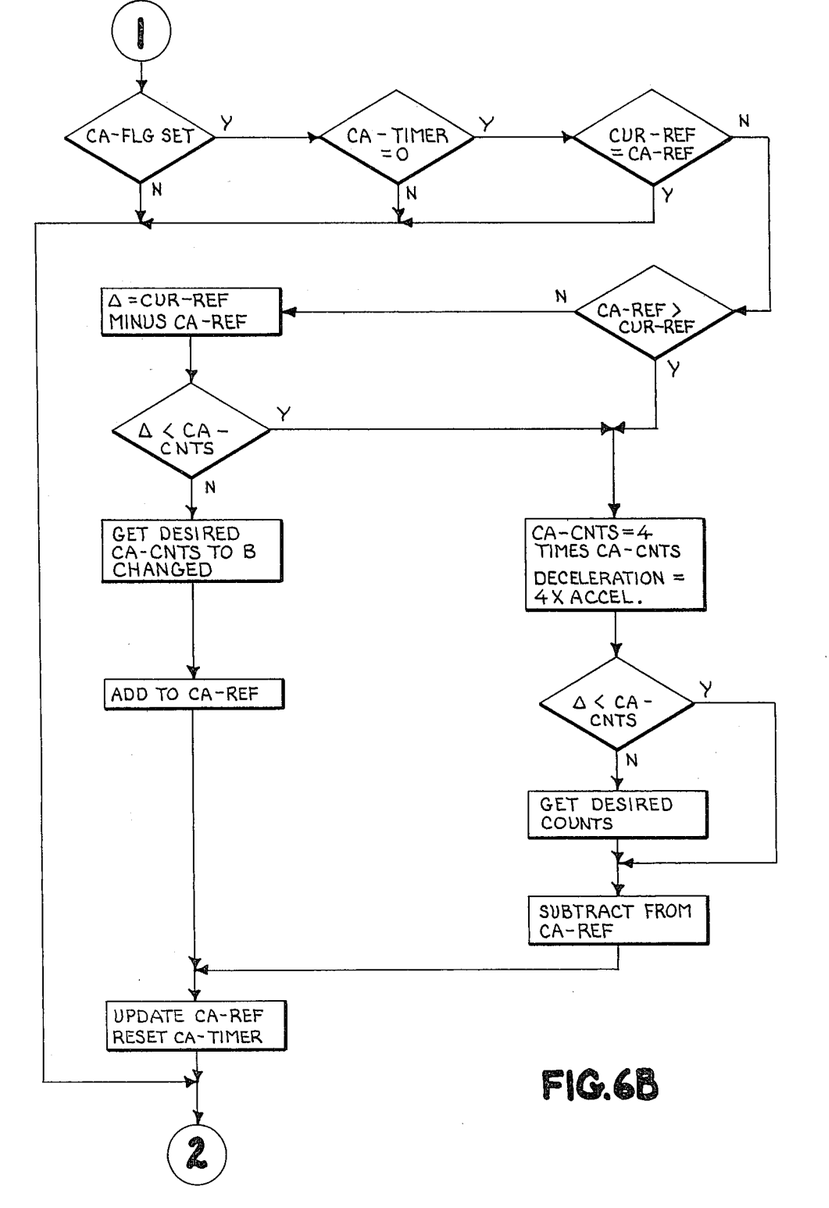

After all of the timers have been updated, the real time clock service routine initiates a second subroutine, shown in FIG. 6B, which determines whether the current command signal (CUR-REF) out of the current limit circuit is increasing or decreasing at a rate faster than that permitted by the control acceleration rate. If the rate of change of the current command signal is less than the limit established by the control acceleration function i.e., if the control accelerator flag is set (CA-FLG SET), this portion of the sub-routine is exited immediately. If the control acceleration rate has been exceeded by the current command signal, the routine then determines whether the current command is increasing or decreasing by comparing the current command with the last control acceleration reference (CA-REF) and updates the control acceleration reference accordingly. The determination of whether current is decreasing or increasing is required since motor current is permitted to decay at a rate four times the rate for increasing current. The control acceleration timer (CA-TIMER=0) limits the CA-REF update routine to a multiple of the interrupt cycles.

Figure 6C:
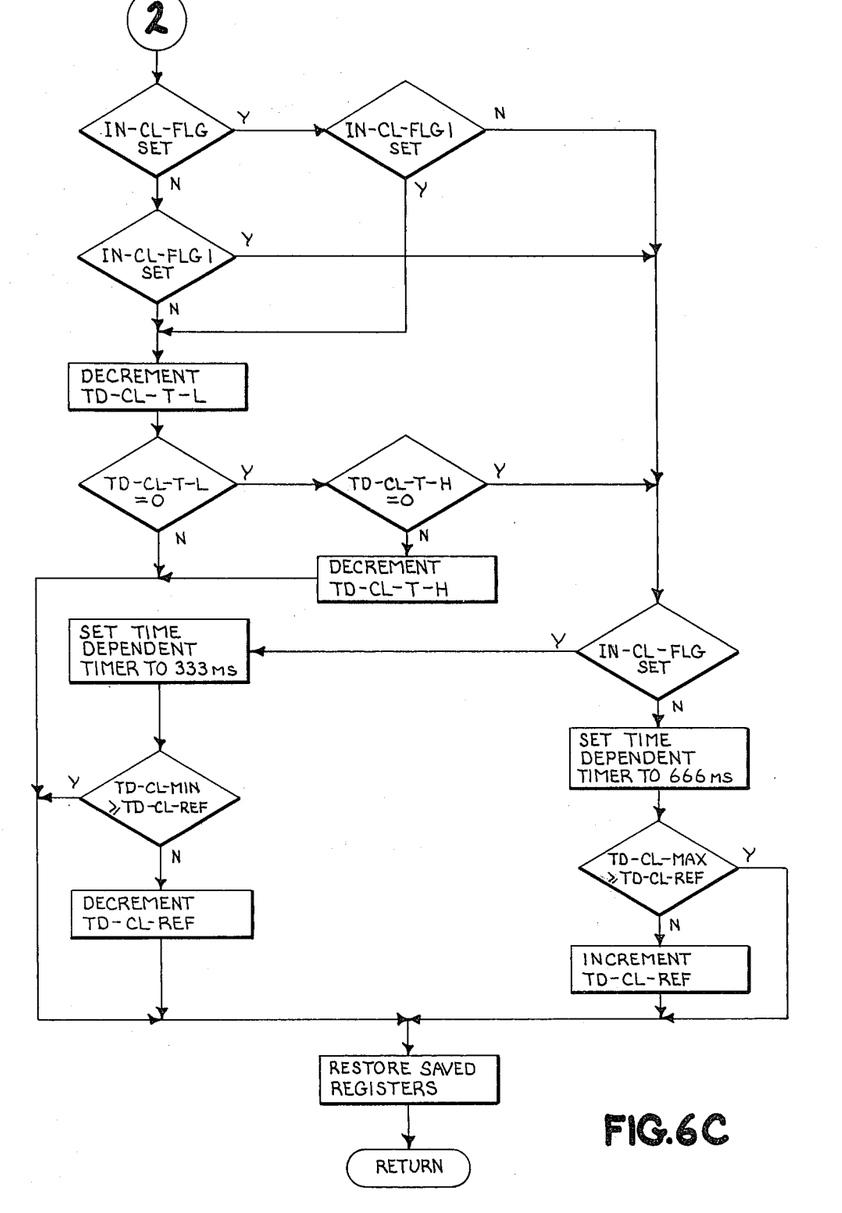

Referring now to FIG. 6C, the real time clock next services the current limit functions. It will be recalled that the real time clock is serviced itself on a one millisecond time interval and that each service routine decrements the timers serviced by the routine by one count. There are two checks made within the current limit update routine. The in-current limit flag (IN-CL-FLG) determines whether the system is presently operating in a current limit mode and the in-current limit flag one (IN-CL-FLG 1) determines whether the system was in a current limit mode the last time that a check was made. Within the routine a first time interval is provided for decreasing the current limit and a second time interval is provided for increasing the current limit. The reason for utilizing two timer intervals is that it is desirable to decrease the current limit value at a rapid rate and then to subsequently allow an increase in the current limit value at a slower rate which permits cooling of the system before applying heavy current overloads. If the IN-CL-FLG flag is presently set but the IN-CL-FLG 1 flag is not set, indicating that the system is now in a current limit mode but was not in a current limit mode the last time through, the timer is loaded to count at the faster rate, for example, 333 milliseconds may be loaded into the timer. If the system then stays in the current load mode, the routine will decrement the timer each millisecond. At the end of the 333 milliseconds the time delay current limit reference (TD-CL-REF) will then be decremented one count and the timer reloaded with the same 333 milliseconds. Accordingly, the time delay current limit reference is decremented one count every time that the counter cycles through its predetermined time period. It should be noted that the timer requires two registers (TD-CL-T-L and TD-CL-T-H) since the 8031 is only an 8-bit processor. When the routine cycles through and determines that the IN-CL-FLG 1 flag had been set but that the system is not currently in a current limit mode, the timer is set to a predetermined high level, for example, 666 milliseconds. Thereafter, so long as the system does not re-enter a current limit mode, the timer will be decremented one count in each cycle and when it counts down to zero will cause the time dependent current limit reference (TD-CL-REF) to be incremented one count. It will be apparent that the rate at which the time dependent current limit is decreased or increased is dependent upon the heating and cooling factors within the system. It should also be noted that the subroutine compares the time dependent current limit minimum value (TD-CL-MIN) to the time dependent current limit reference and, in the event that the minimum is greater than the reference, will simply cause the routine to be exited. The time dependent current limit maximum value (TD-CL-MAX) is also compared with the time dependent current limit reference and, if the maximum value is greater than the reference, the reference will be incremented to a higher value. Both the minimum avalue and the maximum value of the current limit are predetermined values which are determined by the transient thermal capabilities of the regulator. Comparing this routine to FIG. 4, it can be seen that approximately 170 counts are required to change the accelerator reference from zero amperes to 850 amperes, corresponding to a change of five amps per count. Using the 333 milliseconds timer of FIG. 6C, in one second the TD-CL-REF will be decremented three counts which is equivalent to fifteen amps. In twenty seconds the TD-CL-REF will drop from 750 amps to 450 amps, a change of 300 amps. This relationship is illustrated in FIG. 3C. However, if at any time the current commanded drops below the current limit, the time dependent counter (TD-CL-T-L and H) will be set for 666 milliseconds and the TD-CL-REF will be incremented upward by fifteen amps in two seconds. Thus, the recovery time is longer than the fall time to permit thermal recovery of the system. Obviously, the routine of FIG. 6C permits the system to cycle between incrementing and decrementing of the current reference such that the slope of the current reference curve varies as a function of the time that the system is in a current limit mode.

Figure 7:
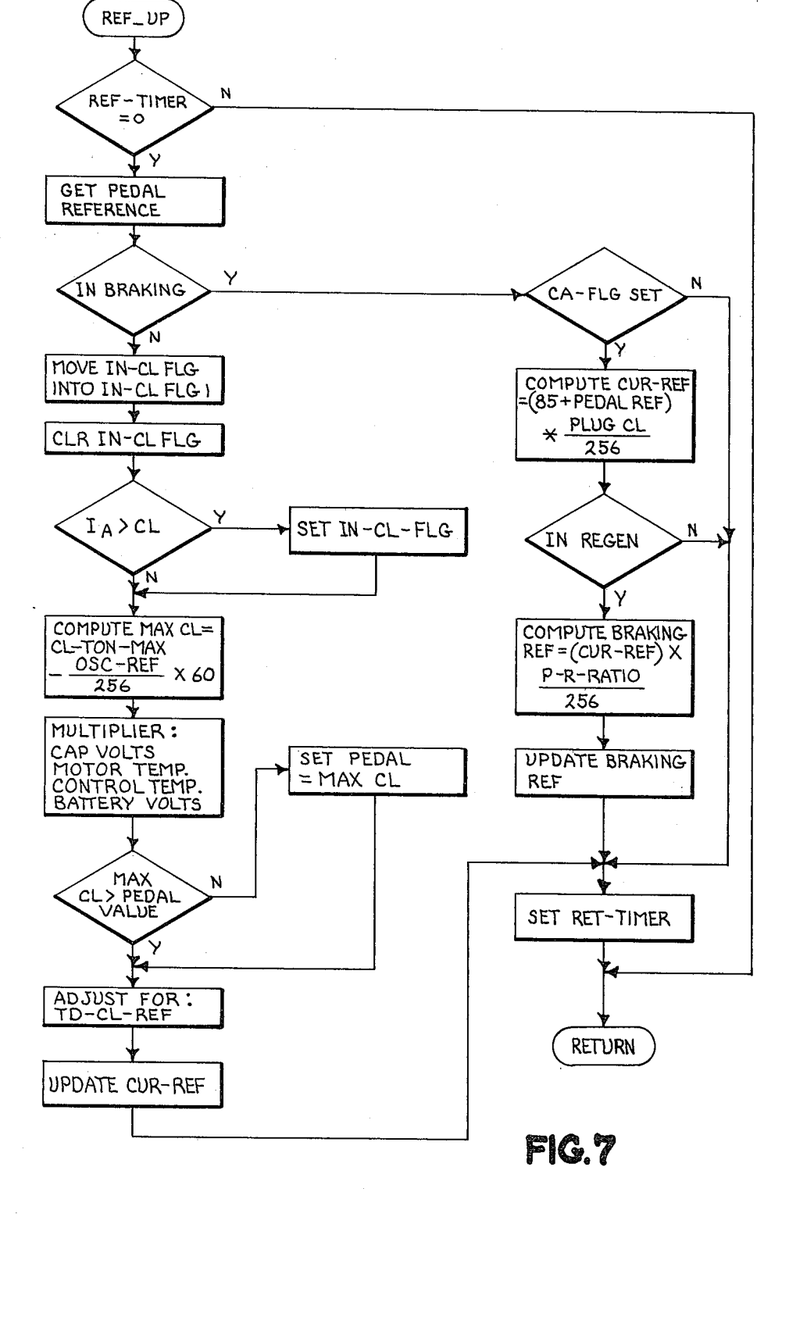
FIG. 7 is a flow chart for that portion of the computer program which determines the permissible motor current magnitude based upon the current limit function of FIG. 3.

Referring now to FIG. 7 there is shown a flow chart for the reference update routine. The reference update routine is also accessed on a one millisecond interrupt basis; however, a reference timer establishes a predetermined time interval between servicing of the routine. In one embodiment the reference timer is set for five milliseconds so that the routine is actually serviced only one out of five interrupt times. The function of the reference update routine is to generate the current command or current reference value (CUR REF). After obtaining the accelerator reference value (GET PEDAL REFERENCE), the routine first determines whether the system is in a braking or motoring mode. If it is in a motoring mode, the present status of the current limit flag (IN-CL-FLG) is transferred into a current limit flag one (IN-CL-FLG 1) register. Armature current ($I_A$) is then compared to the last determined current limit value (CL) and if armature current is greater than the current limit value, the in current limit flag (IN-CL-FLG) is set. The routine then computes a new maximum current limit value (MAX CL) and converts it to a digital count. The current limit value is determined from the maximum allowable current (CL-TON-MAX), e.g., 750 amperes, by subtracting a value proportional to percent conduction time of the chopper circuit 14. The proportional value is the scaled oscillator reference, i.e., OSC-REF/256×60.

The routine next determines whether the capacitor voltage, motor temperature, main switching semiconductor temperature, or battery voltage have reached a point on their characteristic curves (as shown in FIG. 3) where the corresponding values are less than unity. If any one of these characteristics are less than unity, then the routine multiplies the maximum current limit value by the value of the lesser of these characteristics. The result of this multiplication is a modified current limit value which provides additional protection to the motor and regulator system.

The routine next determines whether the maximum current limit value is greater than the accelerator reference value. In the event that the accelerator value is actually greater than the maximum current limit value, the accelerator value is then set at the maximum current limit value. If the accelerator value is less than the maximum current limit value, then the actual accelerator value is utilized as the current reference value. This value of current reference is then adjusted for the time dependent current limit reference which was described in FIG. 6C. Thus, the system selects the lesser of the three values, i.e., the accelerator value, the maximum current limit value established by the percent conduction time curve or the value established by the time dependent current limit reference.

As previously noted, the subroutine also determines whether the system is in a braking or motoring mode. It can be seen that within the braking mode a number of the comparisons with predetermined current limit value are eliminated. The system initially determines whether the commanded braking current exceeds the controlled acceleration rate (CA-FLG-SET) and if it does not, it simply exits the routine. In the event that the commanded braking current exceeds the controlled acceleration rate, a current reference is then computed. The illustrated example shows a current reference value computed based upon the pedal reference counts described in FIG. 4. The particular selection of numbers, of course, is only a factor of scaling. If the system is not in a regenerative braking mode then the computation of current limit value is all that is needed since that value is used in the controlled acceleration update routine. The routine is thereby exited at that point. However, if the system is in regenerative braking, it is then necessary to compute a braking reference which is scaled to a value slightly different than the value used in other forms of braking. Again, the values selected for computing the braking reference will be determined by the particular system and scaling required. After computing the braking reference, that value is used to update the braking reference value. The routine then exits and allows the braking reference to be used to compute a current error value which then controls the operation of the motor.

As will be appreciated, the significant feature of this invention is the utilization of a plurality of current limit values, each of which is selectively compared to a commanded current value with a lesser of the current limit values or the commanded current value being the controlling current limit value for the motor system. By utilizing the time dependent system. By utilizing the time dependent current limit value, the motor can be operated at a higher current limit value in a stalled condition for time periods sufficient to permit overcoming the stalled condition without damaging the motor or the power control electronics. By using this time dependent current limit value, the percent conduction time current limit curve can be set at an appreciably higher level. The use of multiplier values in the motor temperature, control temperature, battery voltage and capacitor voltage, current limit systems provides the optimum limit for all values of percent conduction time.

Although the invention has been shown in what is presently considered to be a preferred embodiment, it will be apparent that many modifications and changes may be made in the system without departing from the true spirit and scope of the invention. Accordingly, it is intended that the invention not be limited by the detailed description contained herein but that it be interpreted within the full spirit and scope of the appended claims.

It is claimed:

1. In a control system for a vehicle having an electric traction motor for providing vehicle propulsion power, the control system including a percent conduction time power regulator responsive to a current reference signal to regulate motor current and also including an accelerator for producing a current command signal having a value corresponding to an operator desired value of said current reference signal, the improvement comprising:
   (a) means for establishing a first current limit value which varies between a maximum and a minimum value inversely with the percent conduction time of said regulator;
   (b) means for establishing a second current limit value which varies between a maximum and a minimum value as an inverse function of the time that the motor current is maintained at the lesser of said first current limit value or such second current limit value;
   (c) means for comparing the current command signal value to the first and second current limit values and for producing said current reference value such that it acquires a value representative of the lesser of said current command signal value, said first current limit value, or said second current limit value; and
   (d) means for applying the current reference value to control the percent conduction time of the power regulator in a manner to minimize any difference between actual motor current magnitude and the magnitude of motor current corresponding to the acquired value of said current reference.

2. The control system of claim 1 wherein said means for establishing said second current limit value is adapted to maintain said second current limit at said maximum value for a first predetermined time interval and to thereafter decrease said second current limit value toward said minimum value at a predetermined rate.

3. The control system of claim 2 wherein said predetermined rate is dependent upon the time during which said current reference value is maintained at the lesser of said first current limit value and said second current limit value.

4. The control system of claim 1 and including:
   (a) means for providing a signal representative of the operating temperature of the power regulator; and,
   (b) means responsive to said operating temperature representative signal for modifying said first current limit value.

5. The control system of claim 4 wherein said operating temperature representative signal has an equivalent value of unity for temperatures less than a predetermined value and has a value decreasing to zero as a function of increasing temperatures above said predetermined value, the control system including means for effectively multiplying said temperature representative signal and said first current limit value to thereby effect a reduction in said first current limit value for increasing temperatures above said predetermined value.

6. The control system of claim 1 wherein the power regulator comprises a thyristor for regulating current to the motor by alternately being rendered conductive and non-conductive, and a commutation circuit for rendering the thyristor non-conductive, the commutation circuit including a capacitor for storing an electrical charge of sufficient magnitude to commutate the thyristor, the control system including:
   (a) means for providing a signal representative of the magnitude of electrical charge stored on the capacitor; and,
   (b) means responsive to said electrical charge signal for modifying said first current limit value.

7. The control system of claim 6 wherein said electrical charge signal has an equivalent value of unity for electrical charge magnitudes less than a predetermined minimum value and has a value decreasing from unity toward zero as a function of a decreasing magnitude of electrical charge below said predetermined minimum value, the control system including means for effectively multiplying said electrical charge signal and said first current limit value to thereby effect a reduction in said first current value for decreasing magnitudes of electrical charge below said predetermined minimum value.

8. The control system of claim 1 wherein the vehicle includes an on-board battery for providing electrical power to the motor, the system including:
   (a) means for providing a signal representative of the magnitude of electrical charge of the battery; and
   (b) means responsive to said battery electrical charge signal for modifying the value of said first current limit value.

9. The control system of claim 8 wherein said battery electrical charge signal has an equivalent value of unity for electrical charge magnitudes greater than a predetermined value and has a value decreasing to zero as a function of a decreasing battery electrical charge below said predetermined value, the control system including means for effectively multiplying said battery electrical charge signal and said first current limit value to thereby effect a reduction in said first current limit value for decreasing magnitudes of battery electrical charge below said predetermined value.

* * * * *